(12) United States Patent
Simon

(10) Patent No.: US 10,317,267 B2
(45) Date of Patent: Jun. 11, 2019

(54) SYSTEM FOR AUTOMATIC DETERMINATION OF LIQUID VOLUME

(71) Applicant: Steve N. G. Simon, Rodney (CA)

(72) Inventor: Steve N. G. Simon, Rodney (CA)

( * ) Notice: Subject to any disclaimer, the term of this patent is extended or adjusted under 35 U.S.C. 154(b) by 0 days.

(21) Appl. No.: 15/562,978

(22) PCT Filed: Mar. 31, 2016

(86) PCT No.: PCT/CA2016/050376
§ 371 (c)(1),
(2) Date: Sep. 29, 2017

(87) PCT Pub. No.: WO2016/154758
PCT Pub. Date: Oct. 6, 2016

(65) Prior Publication Data
US 2018/0106656 A1 Apr. 19, 2018

Related U.S. Application Data

(60) Provisional application No. 62/141,658, filed on Apr. 1, 2015.

(51) Int. Cl.
*G01F 23/18* (2006.01)
*G01F 22/02* (2006.01)
*G01F 23/00* (2006.01)

(52) U.S. Cl.
CPC ............ *G01F 23/18* (2013.01); *G01F 22/02* (2013.01); *G01F 23/0069* (2013.01)

(58) Field of Classification Search
CPC ....... G01F 23/18; G01F 23/0069; G01F 22/02
(Continued)

(56) References Cited

U.S. PATENT DOCUMENTS

| 5,333,498 A | * | 8/1994 | Brackett | .................. B67D 7/08 |
| | | | | 73/198 |
| 5,493,903 A | * | 2/1996 | Allen | ...................... G01F 22/02 |
| | | | | 73/149 |

(Continued)

FOREIGN PATENT DOCUMENTS

EP 2700913 A1 2/2014

OTHER PUBLICATIONS

ISA/CA, International Search Report and Written Opinion for corresponding PCT International Application No. PCT/CA2016/050376 dated May 18, 2016.

(Continued)

*Primary Examiner* — Nathaniel T Woodward
(74) *Attorney, Agent, or Firm* — Brion Raffoul

(57) ABSTRACT

Systems, methods, and devices relating to the determination of a volume of liquid in a container. A pressure sensor is located at a bottom of the container. The pressure sensor senses the pressure exerted on it by the liquid in the container. This pressure is communicated with a data processing device. The data processing device determines the volume of the liquid in the container based on the sensed pressure. This may be done by reference to a look up table containing pressure values and their corresponding volumes. Similarly, this may be done by calculating the volume of the liquid based on the dimensions of the container, the physical qualities of the liquid, and the sensed pressure. The volume of the liquid in the container is then transmitted from the data processing device to a user interface device for presentation to a user.

11 Claims, 5 Drawing Sheets

(58) Field of Classification Search
USPC .......................................................... 73/301
See application file for complete search history.

(56) References Cited

U.S. PATENT DOCUMENTS

2005/0126277 A1     6/2005  Nelson
2010/0114507 A1*    5/2010  Bachmann ............. G01G 17/06
                                                         702/55

OTHER PUBLICATIONS

Australian Examination Report for corresponding Australian Patent Application No. 2016240076 dated Aug. 20, 2018.

* cited by examiner

| Gal | 793 | Gal | 793 |
|---|---|---|---|
| 1040 | 4000 | 650 | 1465 |
| 998 | 3565 | 600 | 1412 |
| 875 | 3250 | 550 | 1375 |
| 800 | 1622 | 500 | 1338 |
| 698 | 1515 | 400 | 1268 |

Select Tank

Save to SD

FIGURE 3

SYSTEM FOR AUTOMATIC DETERMINATION OF LIQUID VOLUME

TECHNICAL FIELD

The present invention relates to methods and devices for determining the volume of a liquid in a container. More specifically, the present invention relates to systems which can be retrofitted to existing farm equipment, such as containers for pesticides, to determine the volume of liquid remaining in the container.

BACKGROUND

Farming in the early 21st century is no longer the rule-of-thumb industry that it once was in past centuries. Farming now involves science, scientific methods, and measured quantities. To this end, materials used to promote the growth of crops and/or the prevention of plant diseases and the prevention of pests need to be properly dispensed in the proper amounts. Most of these materials are dispensed as concentrated liquids to be diluted in water and sprayed on crops or plants as needed. Given that such liquid solutions are to be sprayed across acres of crops, large amounts of such solutions are required and large tanks are used for such ends.

Unfortunately, the practicalities of dealing with such large tanks and the required concentrations of such solutions can be quite difficult. To properly mix the required concentrations of such solutions, the volume of liquid contained in such tanks needs to be known. As well, after dispensing the solution, users may need to know how much of a particular solution is left in the tank before adding more liquids into the tank. Incorrect concentrations and incorrect calculations can lead to potentially dire consequences including crop death and potentially harmful consequences for the user.

Currently, users have no recourse but to use rudimentary methods to determine the volume of liquids left in a tank. Some users use a dipstick to measure the liquid level in the tank and, from that they work out the volume of liquid left in the tank. Others try to empty the tank and add a measured amount of liquid so they know how much liquid is in the tank. However, as can be imagined, none of these solutions is satisfactory. The use of a dipstick is quite inaccurate and emptying the tank to simply refill it can lead to waste and having to deal with potentially large amounts of liquid.

Based on the above, there is therefore a need for a solution to the issue of determining the volume of liquid left in a tank. Such systems, methods, and/or devices preferably avoid the issues with the prior art and preferably provide a user interface that is easy to use.

SUMMARY

The present invention provides for systems, methods, and devices relating to the determination of a volume of liquid in a container. A pressure sensor is located at a bottom of the container. The pressure sensor senses the pressure exerted on it by the liquid in the container. This pressure is communicated with a data processing device. The data processing device determines the volume of the liquid in the container based on the sensed pressure. This may be done by reference to a look up table containing pressure values and their corresponding volumes. Similarly, this may be done by calculating the volume of the liquid based on the dimensions of the container, the physical qualities of the liquid, and the sensed pressure. The volume of the liquid in the container is then transmitted from the data processing device to a user interface device for presentation to a user.

In a first aspect, the present invention provides a system for determining a volume of liquid contained in a container, the system comprising:
   at least one pressure sensor located at a bottom of said container, said pressure sensor determining a pressure exerted by liquid in said container on said sensor;
   a data processing device receiving an output of said at least one pressure sensor, said data processing device determining said volume of said liquid based on said output of said sensor;
   at least one user interface device coupled to said data processing device, said at least one user interface device being for providing a user with an output detailing said volume of said liquid in said container.

In a second aspect, the present invention provides a method for determining a volume of a liquid in a container, the method comprising:
a) placing a pressure sensor at a bottom of said container;
b) detecting a pressure exerted by said liquid on said pressure sensor;
c) correlating said pressure with a corresponding volume of said liquid;
d) presenting said corresponding volume to a user.

BRIEF DESCRIPTION OF THE DRAWINGS

The embodiments of the present invention will now be described by reference to the following figures, in which identical reference numerals in different figures indicate identical elements and in which:
FIGS. 2-5 illustrate screenshots of a user interface screen for the system in FIG. 1.

DETAILED DESCRIPTION

Figure 1:
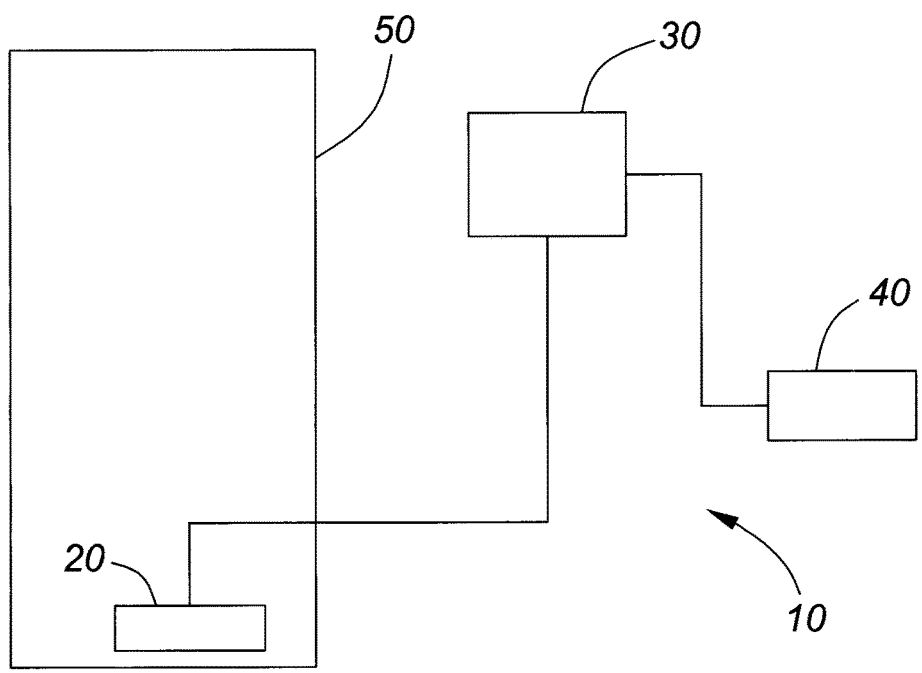
FIG. 1 is a block diagram of a system according to one aspect of the invention.

Referring to FIG. 1, a block diagram of a system 10 according to one aspect of the invention is illustrated. The system 10 includes a pressure sensor 20 coupled to a data processing device 30. The data processing device 30 is coupled to a user interface device 40. Preferably, the pressure sensor 20 is located at the bottom of a container 50 containing a liquid whose volume is to be determined.

The system operates with the pressure sensor 20 sensing the pressure exerted on it by the liquid contained in the container 50. This pressure detected is then transmitted to the data processing device 30. The data processing device 30 then determines the volume of the liquid inside the container 50 based on the pressure sensed by the pressure sensor 20. The volume of the liquid inside the container, as determined by the data processing device 30, is then transmitted to the user interface device 40 for presentation to a user.

The data processing device 30 can determine the volume of the liquid by reference to one or more look up tables. The lookup tables have entries which correlate specific pressure readings with specific volumes of liquid. By determining the pressure detected by the pressure sensor, the data processing device 30 correlates the detected pressure reading with its corresponding volume reading from the look up table(s). The volume in the look up table corresponding to the detected pressure reading is the volume of the liquid left in the container. In one alternative embodiment, in the event the pressure reading from the pressure sensor does not exactly correspond to a pressure reading in the look up table, the data processing device 30 can extrapolate a volume reading from the volume readings for the pressure entries on the table that are closest to the detected pressure reading.

Alternatively, the data processing device 30 can also calculate the volume of the liquid in the container from the pressure detected by the pressure sensor 20. This can be done if the data processing device 30 is provided with the dimensions and configuration of the container as well as the physical characteristics of the liquid (e.g. specific gravity, density, etc.). By determining the internal volume of the container and factoring in the density of the liquid, the liquid's volume can be calculated.

It should be clear that although only one container and one pressure sensor is represented in FIG. 1, other implementations with multiple sensors and multiple containers are possible. For multiple container implementations, each container may have one or more pressure sensors to detect the liquid pressure exerted by the liquids within the container. An implementation with multiple sensors per container may require that readings from the different sensors in a container be weighted, averaged, or otherwise be accounted for by the data processing device when these readings are processed. Of course, for multiple container implementations, the volume of liquid within each container is determined independently of the other containers. Because of this, it is possible to have multiple containers with each container having a liquid different from that of other containers. For such a possibility, the data from different containers might be treated differently to account for the different characteristics of the different liquids in the different containers.

As noted above, the volume of the liquid in the container is to be presented to the user by way of the user interface device 40. This user interface device can be placed directly outside the container or it can be placed at another, more accessible or convenient location. Alternatively, another user interface device can also be present. In one implementation, a user interface device is located outside the container while a second user interface device is placed inside the cab of a vehicle carrying the container (e.g. the cab of a vehicle used to spray crops with the container carrying the liquid used to spray crops). The user interface device can be used to view the output of the data processing device or to enter any parameters which the data processing device may need to determine the volume of the liquid in the container.

It should be noted that the various parts of the system can be coupled to each other by conventional wired means. Similarly, wireless connections between these various parts are also possible. Such wired or wireless coupling means can be used to connect one or more user interface devices to the data processing device. The data processing device may also be coupled to the pressure sensor using wired or wireless means. As can be imagined, since the pressure sensor is to be submerged at the bottom of the container, it is preferable that the data processing device be located remotely from the pressure sensor.

For a farming environment implementation, the data processing device may, in conjunction with one or more user interface devices, provide greater functionality in addition to detailing the volume of liquid in the container. In one implementation, the data processing device gathers data on environmental conditions for the area. Data regarding the date, time, temperature, humidity, wind speed, and wind direction are gathered using a suitable weather station subsystem. Such data can then be provided to the user using the user interface device.

Other functionality may also be built into the data processing device. As an example, the data processing device may be programmed to store previous volume readings for a specific container and determine the change in volume between readings. This way, the data processing device can determine the usage rate of the liquid in the container and present this change in volume to the user.

In implementations where multiple containers are involved, each container can have a pressure sensor that is used to determine the volume of liquid inside the container. As in a single container and single pressure sensor implementation, each pressure sensor is coupled to the data processing device. Each container may have a user interface device to display the volume of liquid within that particular container. Alternatively, a centralized user interface device may be used to display the volume of liquid within each container.

To protect against harsh environmental conditions, parts of the system that may be exposed to the elements can be hardened or be made resistant to such conditions. A weatherproof housing may be used on the various user interface devices and on the data processing device to protect against wind, rain, and other inclement weather conditions.

The data processing device may be equipped with means for storing data that it has gathered. One or more suitable interfaces for data storage means can be incorporated into the data processing device or into the user interface device to provide the user the capability to store detected environmental conditions as well as the volume of liquids stored in one or more containers. The data storage interface may take the form of an SD card slot, a USB port, or any one of a number of suitable interfaces that allow for portable data storage devices to be plugged into the system. Alternatively, the data processing device may be equipped with a wireless connection interface (e.g. a Bluetooth interface) that allows the data processing device to connect to a portable computing device (e.g. a suitably equipped smart phone device). The data gathered can then be uploaded to this portable computing device.

For implementations involving lookup tables, the system may be equipped with multiple tables to account for multiple possible liquids in the container or containers. A user can enter either a type of liquid into the data processing device or the characteristics of a liquid and, based on what the user has entered, one or more suitable lookup tables can be used to determine the volume of the liquid in the container. As an example, if the liquid in one container is mostly water, a table specific pressures and their corresponding volumes for water can be used. Conversely, if the liquid in a container is gasoline, a different table detailing pressures and their corresponding volumes for gasoline should be used. As can be imagined, since water has a higher density than gasoline, the tables for water would have different volume values than the tables for gasoline for the same pressure readings. Depending on the configuration of the data processing device, the device may be equipped with multiple tables for multiple possible liquids. In some implementations, a user simply has to select from a preprogrammed menu which liquid is stored in which container and, when determining the volume of liquid in specific containers, the proper lookup tables are automatically selected and used by the data processing device. Or, alternatively, lookup tables may be provided for specific densities or density ranges of liquids. A user would then enter the density of the liquid within a container and the data processing device would automatically select suitable tables to use for a liquid of that density when determining the volume of liquid in that specific container.

For implementations that may require it, the data processing device may be programmed to take into account environmental conditions when determining the volume of liquids in a container. Depending on the temperature, the density of some liquids may change. To account for this, the data processing device may be programmed to adjust volume outputs based on the sensed temperature of the surrounding area. A suitable temperature factor may be applied to the output of the data processing device or, alternatively, a different lookup table may be used when determining the volume of liquid in a container. In the event the system is not equipped with a weather station sub-system, a user may manually input the environmental conditions for the container so that it may be taken into account by the data processing device.

It should be noted that the lookup tables can also be configured to be specific to specific container sizes and/or shapes. Thus, a 10 liter container that is cylindrical may require different lookup tables than a 100 liter cube-shaped container. The size and/or shape of the container may be programmed into the data processing device by the user and this would allow the data processing device to automatically select the suitable lookup tables to be used.

In one alternative, the system may be configured to allow the user to create and calibrate a lookup table for his needs. For this alternative, the user would program the data processing device for a specific container volume and enter specific volume values for specific pressure readings. This can be done by filling the container with a specific liquid and progressively drain specific amounts of liquid from the container. At each stage, after a specific amount of liquid is drained, the user can enter the volume left in the container to correspond with the pressure reading at that stage. For volume amounts not specifically calibrated for, the data processing device may extrapolate the volume from a given reading. As an example, if a calibrated volume of 10 liters corresponds to a reading of 1 psi and a calibrated volume of 20 liters corresponds to a reading of 2 psi, then a reading of 1.5 psi can be extrapolated to a volume of 15 liters. Of course, while straight-line extrapolation may be used, other extrapolation methods are also possible.

Regarding the pressure sensors, these may be any suitable pressure sensor that measures liquid pressure. For greater accuracy, low pressure sensors have been used in some implementations. Other implementations that do not require very precise pressure measurements may use other types of pressure sensors. Pressure sensors from American Sensor Technologies, specifically sensors from their line of AST4400 series of pressure sensors, have been found to be suitable for implementations involving farm related liquids (e.g. pesticides and pesticide solutions).

The user interface device may be any suitably configured output device capable of providing a visual output to a user. The user interface device may be more capable in the event that the implementation requires input from the user. As such, a touch screen enabled liquid crystal display may be used.

The data processing device may be a digital device suitable for calculating values, receiving input, and retrieving values from lookup tables based on the input received. As such, a suitably programmed programmable logic controller (PLC) may be used as the data processing device. For more complex implementations, such that those that take into account the density of the liquid and the temperature of the surroundings, a suitably programmed general computing device such as a single board computer, may be used.

Figure 2:
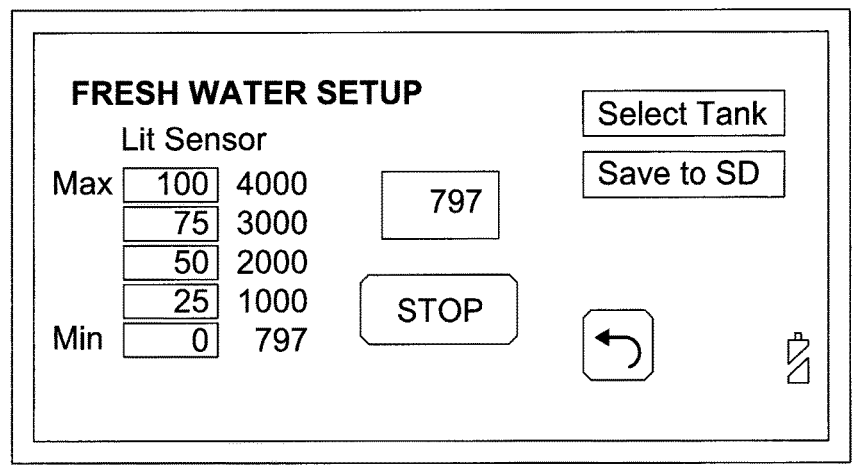
Figure 4:
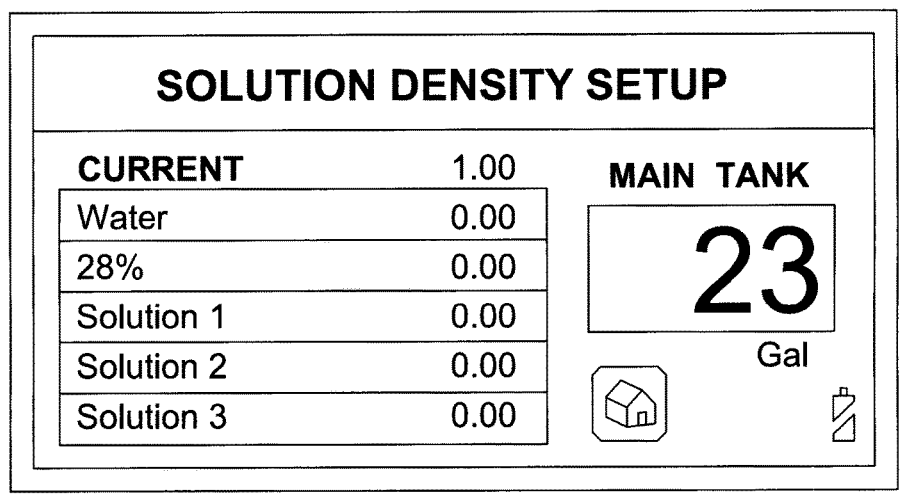
Figure 5:
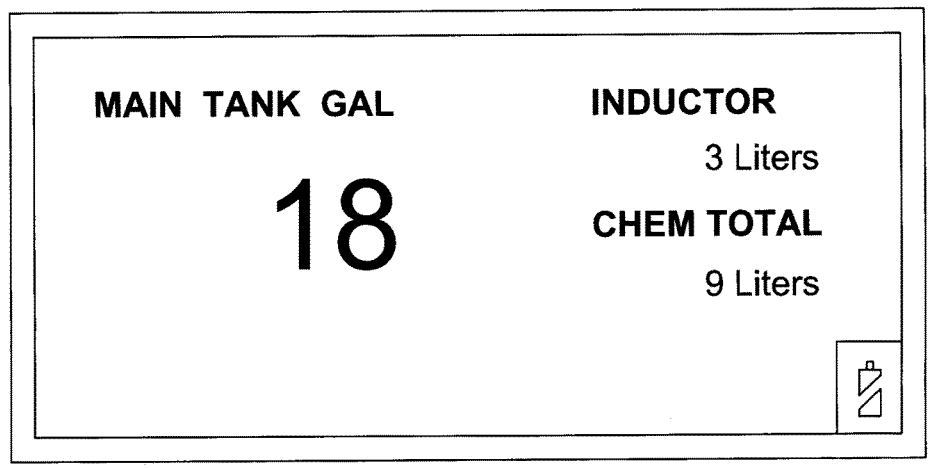

FIGS. 2-5 illustrate a view of the user interface in one implementation of the invention. FIG. 2 illustrates a table for a specific liquid in a specific container. As can be seen, the specific pressure sensor readings for specific volumes of liquid are detailed. FIG. 3 illustrates a calibration window which allows a user to calibrate the system for a specific liquid. It shows the pressure readings and the volume of liquid corresponding that those specific pressure readings. FIG. 4 illustrates a specific implementation that allows a user to set up specific solutions for the system. FIG. 5 illustrates the output that details how much liquid (in gallons) is stored in a specific container.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A system for determining a volume of a liquid contained in a container, the system comprising:
    at least one pressure sensor located at a bottom of said container and immersed in said liquid, said at least one pressure sensor determining a pressure exerted by said liquid in said container on said at least one pressure sensor;
    a weather station sub-system for detecting environmental conditions comprising at least one sensor for determining at least two of a temperature, a wind speed, a wind direction, and a humidity of an area surrounding said system;
    a data processing device receiving an output of said at least one pressure sensor, said data processing device determining said volume of said liquid based on said output of said at least one pressure sensor;
    at least one user interface device coupled to said data processing device, said at least one user interface device being for providing a user with an output detailing said volume of said liquid in said container;
    wherein said data processing device comprises a plurality of look up tables corresponding to multiple possible liquids, wherein at least one look up table contains at least one liquid pressure and at least one corresponding volume, said data processing device determining said volume based on at least one entry in said at least one look up table; and
    wherein said data processing device determines which lookup table to use based on said environmental conditions.

2. The system according to claim 1, wherein said data processing device extrapolates volume values in the event said output from said at least one pressure sensor does not correspond to said at least one entry in said at least one lookup table.

3. The system according to claim 1, wherein said data processing device calculates said volume based on a pressure sensed by said at least one pressure sensor.

4. The system according to claim 1, wherein said data processing device is coupled to said at least one user interface by a wired connection.

5. The system according to claim 1, wherein said data processing device is coupled to said at least one user interface by a wireless connection.

6. The system according to claim 1, wherein said data processing device determines said volume of said liquid based on a type of said liquid.

7. The system according to claim 1, wherein said data processing device determines said volume of said liquid based on a type of said liquid, said type of said liquid being programmed into said data processing device by a user, each type of liquid being associated with specific look up tables to be used when said data processing device is programmed for a specific type of liquid.

8. The system according to claim 1, wherein at least one component of said system is weather resistant.

9. The system according to claim 1, wherein said environmental conditions are presented to said user by way of said user interface device.

10. A method for determining a volume of a liquid in a container, the method comprising:
    a) placing a pressure sensor at a bottom of said container and immersed in said liquid;
    b) detecting a pressure exerted by said liquid on said pressure sensor;
    c) detecting environmental conditions from a weather station sub-system, wherein the environmental conditions include at least two of a temperature, a wind speed, a wind direction, and a humidity of an area surrounding said container;
    d) correlating said pressure with a corresponding volume of said liquid; and
    e) presenting said corresponding volume to a user;
    wherein steps b), c) and d) are executed by a data processing device;
    wherein said data processing device comprises a plurality of look up tables corresponding to multiple possible liquids, wherein at least one look up table contains at least one liquid pressure and at least one corresponding volume, said data processing device determines said volume based on at least one entry in said at least one look up table; and
    wherein said data processing device determines which lookup table to use based on said environmental conditions.

11. The method according to claim 10, wherein steps b), c) and d) are executed by said data processing device in a system comprising:
    said pressure sensor located at said bottom of said container;
    said weather station sub-system comprising at least one sensor for determining at least one of a temperature, a wind speed, a wind direction, and a humidity of an area surrounding said system;
    said data processing device receiving an output of said pressure sensor; and
    at least one user interface device coupled to said data processing device, said at least one user interface device being for providing a user with an output detailing said volume of said liquid in said container.

* * * * *